United States Patent [19]

Decarolis

[11] Patent Number: 4,660,284
[45] Date of Patent: Apr. 28, 1987

[54] FOLDING POCKET SAW

[75] Inventor: Joseph P. Decarolis, Bristol, Conn.

[73] Assignee: The Stanley Works, New Britain, Conn.

[21] Appl. No.: 755,916

[22] Filed: Jul. 17, 1985

[51] Int. Cl.⁴ .................. B27B 71/00; B26B 1/04
[52] U.S. Cl. ................................ 30/157; 30/161; 30/166 R
[58] Field of Search ............... 30/166 R, 157, 156, 30/161, 160, 331, 337, 338, 519

[56] References Cited

U.S. PATENT DOCUMENTS

| | | |
|---|---|---|
| 252,179 | 1/1882 | Bush . |
| D. 257,943 | 1/1981 | Finlay . |
| 692,092 | 1/1902 | Upham . |
| 698,764 | 4/1902 | Tyler . |
| 784,674 | 3/1905 | Haag . |
| 981,786 | 1/1911 | Montgomery . |
| 1,638,749 | 8/1927 | Santoyo . |
| 2,736,354 | 2/1956 | Koskela . |
| 2,747,631 | 5/1956 | Behlefeldt . |
| 2,904,373 | 9/1959 | Dowdy et al. . |
| 3,245,445 | 4/1966 | Herman et al. . |
| 3,404,456 | 10/1968 | Chilko .................... 30/153 |
| 3,641,667 | 2/1972 | Leopoldi .............. 30/156 X |
| 3,927,473 | 12/1975 | Braginotz ............ 30/162 X |
| 4,451,982 | 6/1984 | Collins ................. 30/157 X |

FOREIGN PATENT DOCUMENTS

| | | |
|---|---|---|
| 0100377 | 5/1984 | European Pat. Off. . |
| 3324637 | 3/1983 | Fed. Rep. of Germany . |

*Primary Examiner*—Douglas D. Watts

[57] ABSTRACT

A folding pocket saw or other tool having interchangeable blades employs a handle in which is pivotally mounted a head member on which the blades are affixed. The head member has means thereon which cooperates with a slide lock to alternatively secure it in its open and closed positions, and the handle is of hollow construction to provide both an underlying cavity for containment of the folded blade and also a storage compartment for holding a supply of replacement blades.

20 Claims, 16 Drawing Figures

FOLDING POCKET SAW

BACKGROUND OF THE INVENTION

Folding pocket saws are currently available in a wide variety of forms, and generally consist of a handle in which at least one blade is pivotably mounted for movement between a folded or closed position, and an extended or open position in which it is in condition for use. For example, one folding saw that is commercially available includes a pair of blades that are mounted directly in the handle and are stored by folding them into its upper surface; the blades are biased by a spring washer disposed between them on their pivot screw, and a slide lock is provided which is received in a recess in the bottom surface of the handle and is drawn rearwardly to unlock the blades and permit their movement. Another commercially available saw has a blade directly pivoted upon one screw and a latch member pivoted upon a second screw spaced therefrom, the latter acting to lock the blade in position. Folding knives having slide switches operated from the side of the handle are of course also commonly known.

There is as well a considerable body of patent art that is pertinent to the construction of tools having folding blades. Thus, Chilko U.S. Pat. No. 3,404,456 discloses an over-center spring loading arrangement for the folding blade of a saw, by which it is held in either the open or the closed position. A spring loaded lever is employed in the tool shown in Montgomery U.S. Pat. No. 981,786, which functions to lock the blade in either of two open, as well as its closed, position. A pruning saw with a spring-loaded locking bolt is disclosed in Santoyo U.S. Pat. No. 1,638,749, and in U.S. Pat. No. 692,092 Upham shows a pocket knife with folding blades, which apparently are held in position by conventional spring loading means.

Each of the following U.S. patents utilizes some form of mechanical lock to retain a blade in extended position: Finlay U.S. Pat. No. Des. 257,943; Koskela U.S. Pat. No. 2,736,354; Behlefeldt U.S. Pat. No. 2,747,631 (multiple blade positions); Dowdy et al U.S. Pat. No. 2,904,373 (a water-tight compartment also being provided within the handle); Herman et al U.S. Pat. No. 3,245,445; and Bush U.S. Pat. No. 252,179. Tyler U.S. Pat. No. 698,764 shows a folding saw in which the blade is partially received within the handle, and a combination tool is disclosed in Haag U.S. Pat. No. 784,674, which has a saw blade formed with apertures to receive a detent for locking it in each of several pivoted positions. European Patent application No. 100 377 discloses a folding knife construction in which a number of blades rotate about a common pivot, spring action being employed to hold them in open or closed positions, and German Offenlegungsschrift DE No. 33 24 637 discloses a folding pocket knife construction in which a spring loaded member cooperates to secure the blades.

Despite the rather extensive activity in the art indicated by the foregoing, a need remains for a sturdy and durable pocket tool, which is relatively facile and inexpensive to manufacture and in which interchangeable blades of various types can readily and securely be mounted, for movement between open and closed positions and for highly effective use.

Accordingly, it is an object of the present invention to provide a novel handle assembly for a tool having interchangeable fold-away blades, which is sturdy and durable and yet relatively facile and inexpensive to manufacture.

It is also an object of the invention to provide such a handle assembly in which blades of various types can readily and securely be mounted for highly effective and convenient use.

It is another object of the invention to provide such an assembly wherein the head member on which the blades are mounted can be secured in both its open and closed positions in a simple and yet effective manner, and from which the mounted blade can conveniently be unfolded to its operative position.

Yet another object of the invention is to provide such a handle assembly wherein the body of the handle serves not only to contain the folded blade but also to store a supply of replacement blades.

Additional objects concern the provision of a novel tool employing a handle assembly having the foregoing features and advantages.

SUMMARY OF THE INVENTION

It has now been found that certain of the foregoing and related objects of the invention are readily attained by the provision of a handle assembly for a tool having interchangeable, fold-away blades, comprising an elongated body adapted to be hand held, and a tool-supporting head member pivotably mounted adjacent the forward end of the body. The head member pivots about a transverse axis between an operative position, in which a supported blade extends axially outwardly of the body, and a storage position in which the blade is folded inwardly along the underside thereof. The assembly also includes means on the body for engaging the head member against rotation about the transverse axis in both of its positions, the head member having means thereon for disengageably affixing each of a plurality of different blades thereto for operation by the handle assembly.

Generally, the head member will be mounted within the body, which will have an opening extending longitudinally along the forward end and the underside thereof to permit rotation of the head member with a blade affixed to it. Normally, the body will have an elongated cavity in its lower portion, which is coextensive with the opening along part of its length, and is adapted for the substantial containment of a blade affixed to the head member. The body will advantageously be substantially hollow, with an internal web element extending laterally and longitudinally thereof to provide the lower wall of a blade storage chamber, an opening being formed in the body to permit the insertion and withdrawal of blades into and from the storage chamber and a displaceable closure being provided thereon for covering the opening; in such a construction, the web element that defines the lower wall of the storage chamber may also define the top of the containment cavity. The body will generally include an abutment component upon which the head member rests in its operative position.

In the preferred embodiments, the engaging means will comprise a locking member and the head member will have elements thereon adapted for engagement therewith, the locking member being movable to and from a position of engagement to restrain rotation of the head member from the extended position toward the folded position, and vice versa. The head member may have a peripheral edge portion configured to provide the engaging elements, which may comprise surface elements disposed to opposite sides of the transverse axis of pivoting. More particularly, one of the surface elements will desirably extend generally along a diametrical axis taken through the transverse pivotal axis, with the other element extending generally perpendicularly thereto. In its engagement position, the locking member will bear upon the "one" surface element of the edge portion in the folded position of the head member, and will bear upon the "other" surface element in the open position thereof, the surface elements being so disposed on the member that each lies above the transverse axis when the locking member bears thereupon.

The locking member will normally be mounted in the upper portion of the body for sliding movement along a longitudinal axis, and it will most desirably have a shoe portion with first and second surface elements perpendicularly disposed on its lower forward part to bear, respectively, upon the "one" and "other" surface elements of the head member. To cooperate therewith, the section of the peripheral edge portion of the head member, lying between the engaging elements thereof, will advantageously be of arcuate configuration, and will have the "one" surface element extending inwardly therefrom along the diametrical axis to provide a shoulder element at the juncture therebetween. The assembly will usually include means for biasing the locking member forwardly on the body, thereby urging the "first" surface element of the shoe portion against the "one" surface element of the head member to maintain the folded position thereof, the locking member being displaceable rearwardly against the biasing means by manual force applied to pivot the head member from its folded position, such force being transmitted by contact of the shoulder element of the head member upon the "first" surface of the shoe portion. The latter will ride upon the arcuate peripheral edge section of the head member, during its movement subsequent to such displacement of the locking member, and the lower forward part of the shoe portion will preferably be formed with a transition surface element extending between the perpendicularly disposed surface elements thereof, the transition element bearing upon the arcuate section during such sebsequent movement.

The surface elements of the head member may be provided by a pair of generally L-shaped notches formed into its periphery, each of the notches providing a radial surface element, extending along the diametrical axis, and a chordal surface element extending perpendicularly thereto from the inner end of the radial element, the chordal elements being equidistantly spaced from the transverse pivotal axis. To cooperate with such a construction, the shoe portion of the locking member will seat within the notches in both the operative and also the folded positions of the head member. Usually, the locking member will include a button portion that lies outwardly of the body and is accessible for finger actuating contact.

The head member may, even more specifically, comprise a head piece having a recess formed into one side and extending to the peripheral edge thereof, with a tongue protruding into the recess adjacent its inner end and a transverse aperture therethrough; a clamping piece having a transverse aperture aligned with the aperture of the head piece; and a removable fastener extending through the apertures and disengageably securing the head piece and clamping piece together. The head piece and clamping piece will cooperatively provide the means for affixing blades on the head member, and will be adapted to secure blades having an end portion configured to seat within the recess of the head piece in engagement with the protruding tongue, and to receive the fastener therethrough. Thus, the head member will support such a blade at two points, as well as clamping it between the head piece and the clamping piece of which it is comprised.

Other objects of the invention are attained by the provision of a tool including a removable blade and a handle assembly. The latter will be constructed as described herein, and will have the various features set forth.

DETAILED DESCRIPTION OF THE ILLUSTRATED EMBODIMENT

Turning now in detail to the appended drawings, therein illustrated is a folding pocket saw embodying the present invention and consisting of a handle generally designated by the numeral 10, a saw blade generally designated by the numeral 12, and a blade mounting subassembly, including a pivotable head generally designated by the numeral 52. The handle is dimensioned and configured to be held comfortably by the user, and consists of two mated sections 14, 16, which will generally be molded of a suitable tough plastic material.

Figure 12:
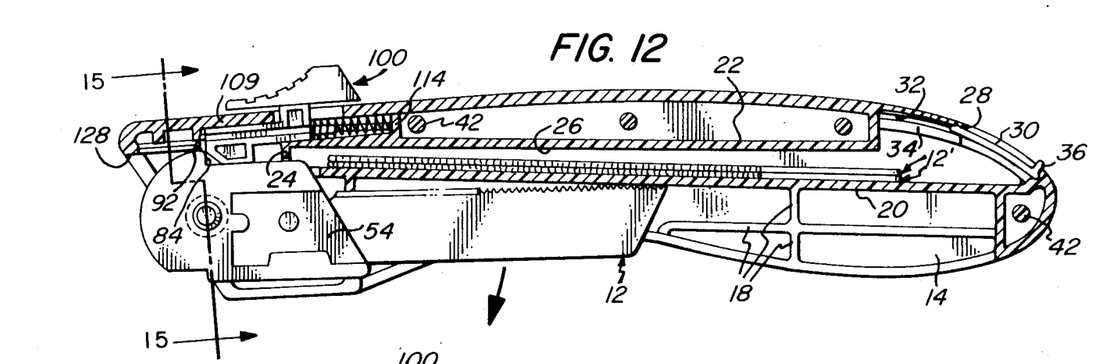
FIG. 12 is an elevational view of the saw of the foregoing Figures, with one side of the handle casing removed to show internal construction and also showing the storage of extra blades therewithin.

As is best seen in FIGS. 12-16, the handle body or casing is substantially hollow, and both sections are formed with a pattern of internal web elements 18, which serve to reinforce the handle. In addition, two web elements 20, 22 on each of the casing halves cooperatively form laterally and longitudinally extending walls, which span the handle and are spaced from one another to define therebetween, in cooperation with the forward wall element 24, an internal chamber 26 for the storage of spare blades 12' (as seen in FIG. 12). A rectangular hatch 28 is formed through the top wall of the handle, and a door 30 is slidably supported in the lateral channels 32, defined by longitudinal ribs 34, to guide the door between open and closed positions over the hatch. The door 30 has a tab 36 along one edge, which serves as a handle for sliding it back and forth, and it has a small rib 38 along its opposite edge; the rib snaps into the groove 40, formed into the body along the upper margin of the hatch 28, to maintain the door 30 in its closed position.

Figure 15:
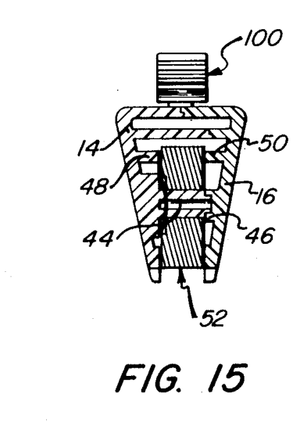
FIG. 15 is a sectional view taken along line 15—15 of FIG. 12.
Figure 16:
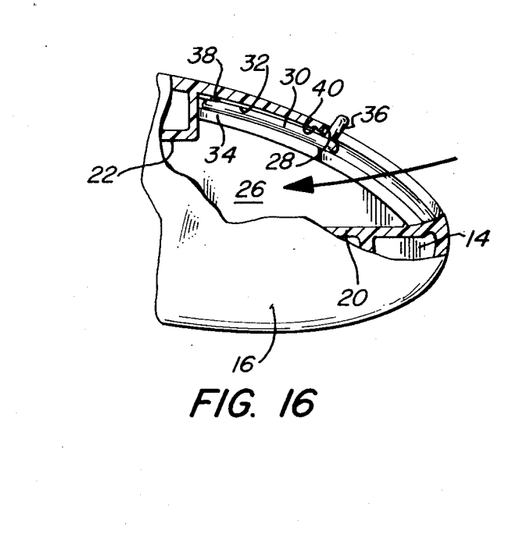
FIG. 16 is a fragmentary elevational view of the back end of the handle, with a portion of the casing broken away to show the blade storage chamber provided therewithin.

As will be appreciated, the two sections of the handle are substantially mirror image forms of one another. One structural difference between them, however, resides in the provision of laterally extending pins 42 on section 14, and mating hollow bosses (not shown) on section 16, the pins being received within and ultrasonically bonded to the bosses to permanently assemble the handle. Similarly, and as is best seen in FIG. 15, section 14 has a relatively large diameter laterally extending post 44 adjacent its forward end, and the opposite part 16 has a socket 46 thereon within which the outer end 45 of the post 44 is seated. The post 44 serves as the axle upon which the blade mounting subassembly is supported, and the circular formations 48, 50, provided at the base of the post 44 and boss 46, respectively, provide bearing surfaces therefor.

The mounting subassembly itself consists of the head 52, a clamping plate 54, and a screw 56 which fastens the other two parts together. The head 52 has a forward portion 58, into one side of which is formed an irregularly shaped recess 60, extending to the inclined edge 62 thereof. A small tongue 64 projects into the recess 60, and an aperture 66 is formed through the head at a point spaced forwardly from the tongue 64.

Figures 1, 2, 3, 4:
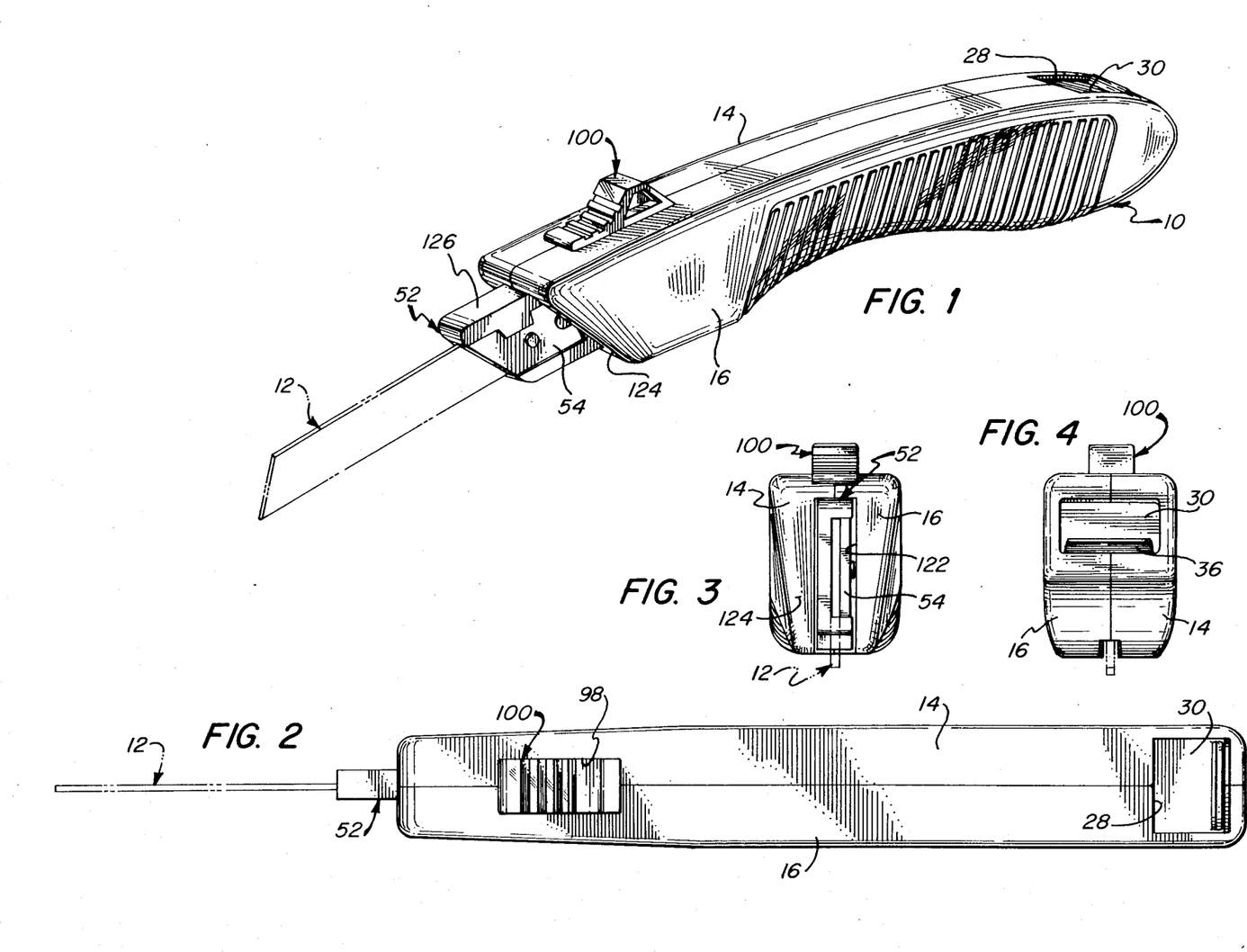
FIG. 1 is a perspective view of a folding saw embodying the present invention, showing the saw blade in phantom line.
FIG. 2 is a plan view of the saw of FIG. 1.
FIGS. 3 and 4 are, respectively, front and back end views of the saw.
Figure 5:
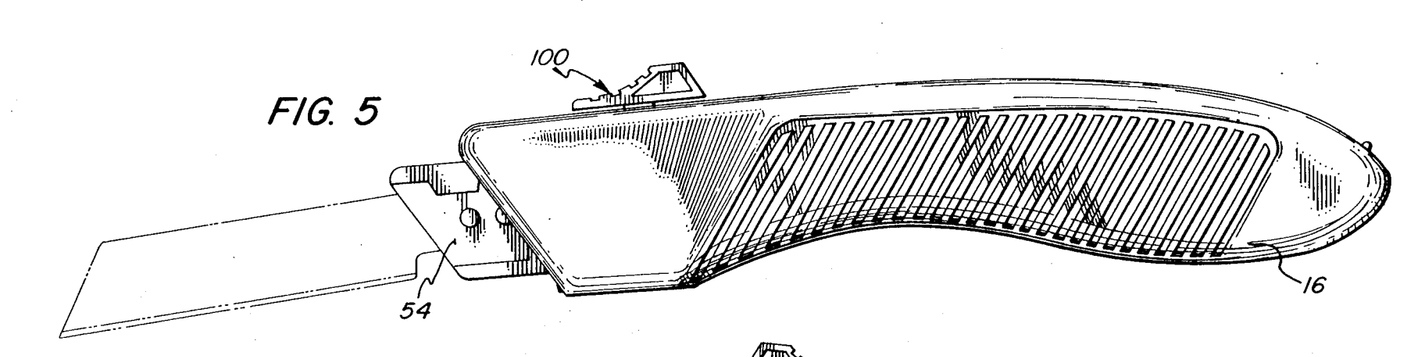
FIGS. 5 and 6 are, respectively, views of the opposite sides of the saw.
Figure 6:
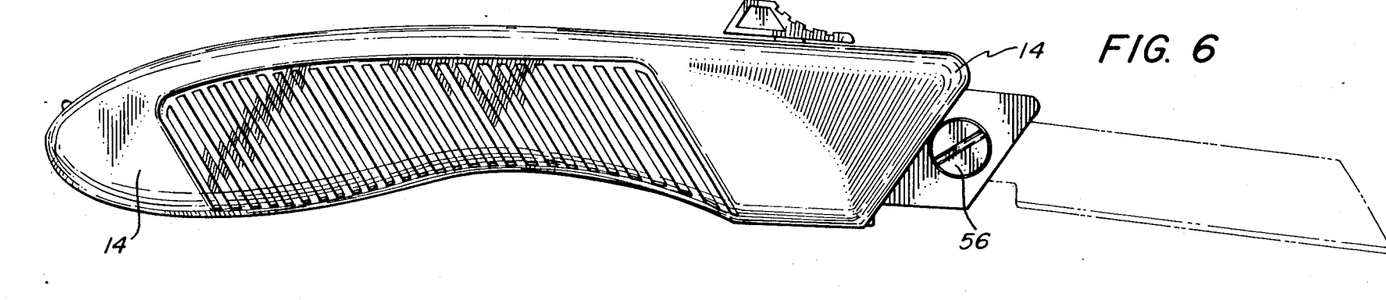
Figure 7:
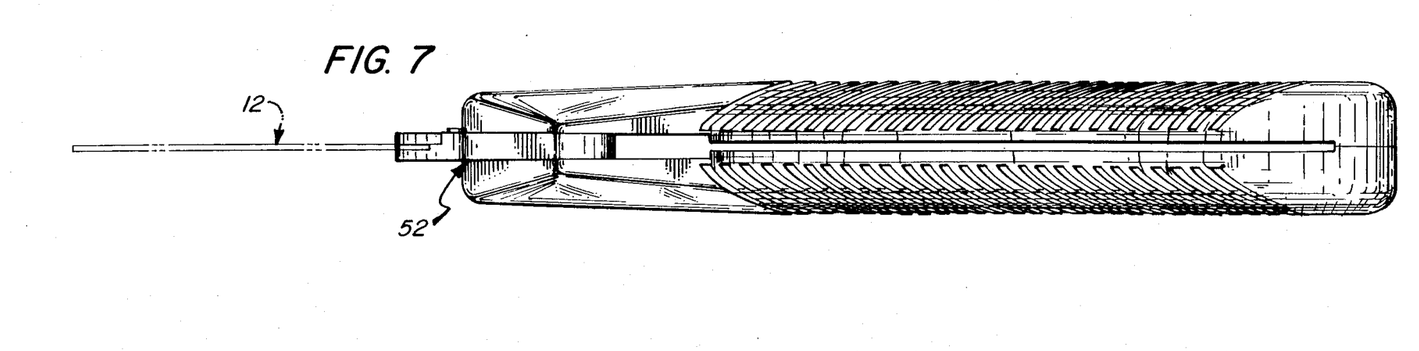
FIG. 7 is a bottom view thereof.
Figure 8:
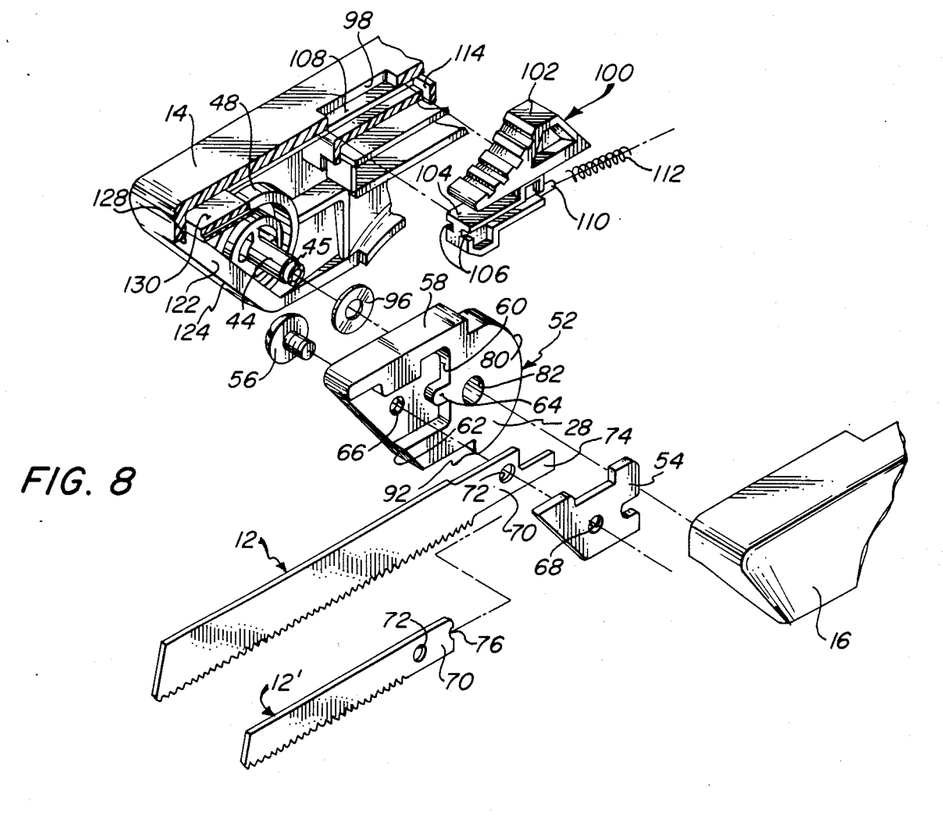
FIG. 8 is a fragmentary exploded perspective view of the forward end portion of the saw of the foregoing Figures, showing two styles of blades adapted for mounting on the handle assembly.

The clamping piece 54 has a peripheral configuration that is essentially identical to that of the recess 60 in the head 52, to seat snugly therewithin. It also has a threaded aperture 68 extending through it, located to align with the aperture 66. As will be appreciated, the saw blade 12, 12' (see FIG. 8) is affixed on the mounting subassembly by placing its inner end portion 70 into the recess 60 with its aperture 72 aligned with apertures 66, 68 of the pieces 52, 54. In the case of the larger blade 12, the inner end portion 70 terminates in a tang element 74 of reduced width, which engages under the tongue 64 in its inserted position. Consequently, when the screw 56 is engaged within the aligned apertures 66, 58, 72, two-point support for the blade, secured by the clamping of piece 54 thereupon, is provided. The smaller of the two blades shown in FIG. 8 has a semicircular notch 76 formed into the back edge of its innermost end 70, which engages the rounded tip of the tongue 64 when the blade 12 is properly positioned within the recess 60, again providing two-point support for the blade. It will be appreciated that the head 52 may be formed with secondary recesses (not illustrated) within the main recess 60, shaped to provide additional supporting elements along the edges of the saw blade, if so desired.

The rearward or inner end portion 78 of the head 52 (considering it in its operative position) has a circular edge section 80 which is coaxially disposed with respect to the aperture 82, the latter receiving the post 44 for pivotal mounting of the subassembly. The periphery of the head 52 is formed with a pair of L-shaped notches or steps at the ends of the circular section 80, which provide radially extending surface elements 84, 86, and chordally extending elements 88, 90 prependicular to the elements 84, 86 (and to an imaginary diametrical axis drawn therethrough and through the center point of the aperture 82); a shoulder element 92 is formed at the intersection of the radial surface element 84 and the circular edge section 80.

Figures 9, 10, 11:
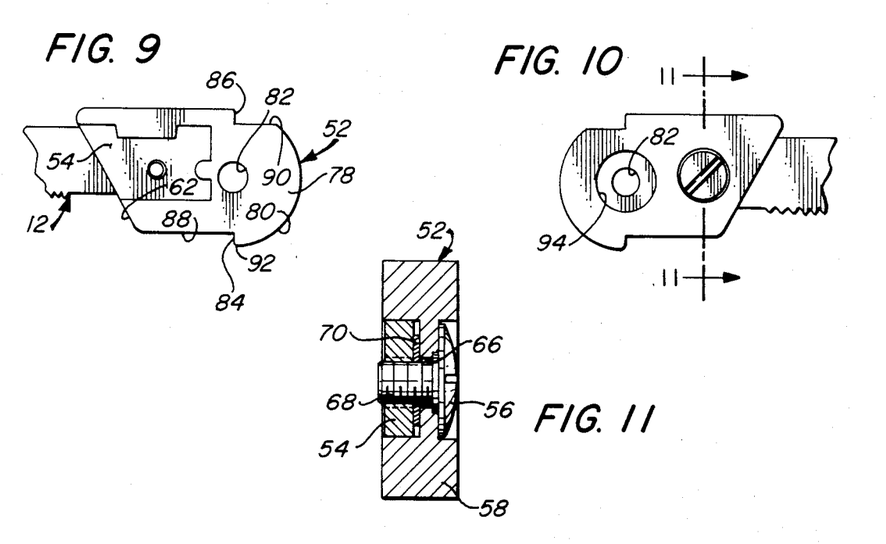
FIGS. 9 and 10 are elevational views of the opposite sides of the blade mounting subassembly utilized in the saw, fragmentarily illustrating the mounted blade.
FIG. 11 is a sectional view of the mounting subassembly illustrated in FIGS. 9 and 10, taken along line 11—11 of FIG. 10 and drawn to a scale enlarged therefrom.

As seen in FIG. 10, one side of the head 52 is formed with an annular recess 94 about the aperture 82, in which is seated a spring washer 96. The washer 96 produces an axial bias upon the head 52, thus minimizing any tendency that might exist for looseness or wobbling of the mounting subassembly within the handle.

The upper wall components of the two casing halves 14, 16 are indented to cooperatively define a small rectangular opening 98, within which is mounted a push-button slide lock, generally designated by the numeral 100. The lock in turn consists of a button portion 102 and a locking shoe portion 104, the latter having slot formation 106 along its opposite sides. Each of the two body sections 14, 16 has a flange element extending longitudinally along its inside surface adjacent the indent for the opening 98, the marginal portions of which are engaged within the slot formations 106 of the shoe portion 104; thus, the lock 100 is slidably mounted for longitudinal movement within the opening 98. A short stud 110 projects rearwardly from the back of the slide lock, on which is mounted a coil spring 112. The latter bears upon the small internal end wall 114, and serves to urge the lock 100 in the forward direction.

Figure 13:
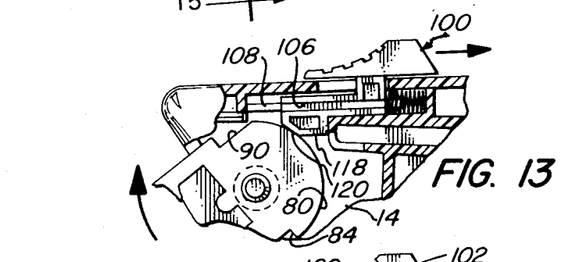
FIG. 13 is a fragmentary elevational view of the saw, taken at the forward end of the handle and showing the mounting subassembly in a position intermediate the folded and fully extended positions thereof.
Figure 14:
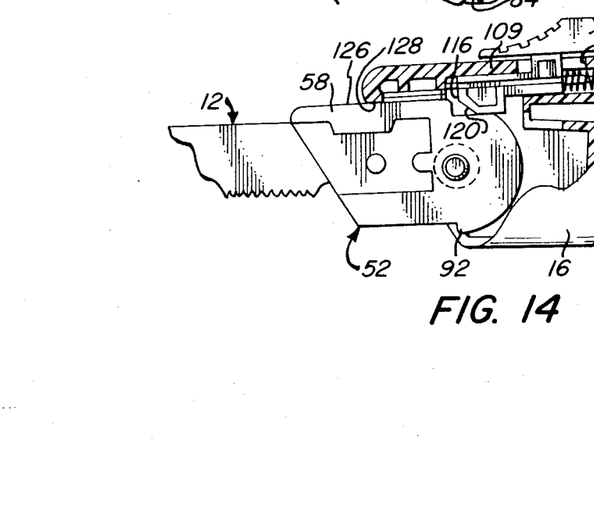
FIG. 14 is a similar fragmentary elevational view showing the blade opened to its operative position.

As is perhaps most clearly illustrated in FIGS. 12–14, the lower forward part of the shoe portion 104 is configured to provide perpendicular forward and bottom faces 116, 118, respectively, joined by an oblique transition surface 120 disposed therebetween. In the extended, operative position of the blade (shown in FIGS. 1–7 and 14) the forward portion 58 of the head 52 projects through the section of the longitudinal slot 122 that extends along the forward, inclined surface 124 of handle body. The upper edge 126 of the head 52 bears not only upon the overlying surface 128 at the top of the slot 122, but upon the transverse abutment element 130 formed on the body section 14, as well. Thus, sturdy support is provided for the saw blade to resist the downward force applied in cutting the workpiece.

In that position of the blade, the shoe portion 104 of the lock 100 is also wedged between the top wall section 109 of the handle and the head 52 with the bottom surface 118 of the shoe portion bearing upon the chordal surface 90, as seen in FIG. 14. Release of the blade-mounting subassembly is effected simply by drawing the lock 100 rearwardly against the bias of the coil spring 112, to disengage the surfaces 90, 118.

The folded position of the blade is illustrated in FIG. 12, from which it can be seen that the head subassembly has been rotated through an angle of 180° from the extended position, thereby presenting to the lock 100 the notch on the opposite side of the head 52. When the shoe portion 104 is returned to its advanced position and seated within the notch, the surface element 116 at the forward end thereof is brought to bear upon the radial surface element 84, thereby maintaining the blade 12 in position within the internal cavity 124, which is defined by the wall 20 and the sides of the casing sections 14, 16. It will be appreciated that the slot 122 extends along substantially the entire length of the handle body to permit passage of the blade and head subassembly, as described.

To extend the blade, it is merely necessary to grasp it (as will be facilitated by the inward curvature of the lower portion of the handle) and pivot it downwardly. This will cause the shoulder element 92, formed at the end of the circular edge section 80 of the head 52, to bear upon the surface element 116 of the shoe portion 104, in turn forcing the lock 100 rearwardly; i.e., in this condition of the head the lock functions as a non-positive detent. After pivoting through a relatively small arc, the shoulder element 92 will pass to the oblique transition surface element 120, which will thereafter ride upon the circular section 80 until the chordal element 90 is presented to the locking shoe portion, whereupon the operative position will be reestablished; the relationship of the parts in transition is illustrated in FIG. 13.

As will be appreciated, the handle assembly described herein is not only suitable for use with a variety of different saw blades, but also with other types of blades, such as of knives, razors, and the like. The materials employed for construction of the several parts of the device will be evident to those skilled in the art, plastics and metals generally being most advantageously used. Finally, although the configuration of the handle body illustrated is highly desirable from the standpoint of comfort and aesthetic appeal, it will be appreciated that considerable variation therein, as well as in the nature and placement of the locking button, is possible.

Thus, it can be seen that the present invention provides a novel handle assembly for a tool having interchangeable fold-away blades. The handle assembly is sturdy and durable, and yet relatively facile and inexpensive to manufacture, and it readily permits the secure mounting of blades of various types for highly effective and convenient use. The head member on which the blades are mounted can be secured in both its open and closed positions in a simple and yet effective manner, and the body of the handle serves not only to contain the folded blade but also to store a supply thereof. In addition, the invention provides a novel tool employing a handle assembly having the foregoing features and advantages.

Having thus described the invention, what is claimed is:

1. A handle assembly for a tool having an interchangeable, fold-away blade, comprising: an elongated body adapted to be hand held and providing a cavity therewithin, said body having an opening into said cavity extending longitudinally along its forward end and along the underside thereof; a tool-supporting head member mounted in said cavity adjacent said forward end of said body for pivotal movement about a transverse axis between an operative position in which a blade mounting portion thereof extends outwardly of said forward end of said body, and a storage position in which it is pivoted downwardly and rearwardly about its pivotal axis to locate a blade mounted thereon in said cavity portion thereof; and manipulatable locking means movably mounted on said body having a manipulatable portion extending outwardly thereof for releasably locking said head member in both of said pivoted positions thereof against pivoting about said transverse axis, said head member having means on said mounting portion for disengageably affixing a blade thereon for operation by said handle assembly, said opening into said cavity being dimensioned to permit pivoting thereinto of the mounted blade.

2. The assembly of claim 1 wherein said body is substantially hollow and has an internal web element extending laterally and longitudinally thereof to provide the lower wall of a blade storage chamber therewithin, said body having an opening formed therein permitting the insertion and withdrawal of blades into and from said storage chamber, said body having a displaceable closure thereon for covering said storage chamber opening.

3. The assembly of claim 2 wherein said web element defines the top of the cavity for the mounted blade.

4. The assembly of claim 1 wherein said body includes an abutment surface upon which said head member bears in said operative position thereof, said surface serving to preventing further rotation in the direction of movement from said folded position to said operative position of said head member.

5. The assembly of claim 1 wherein said locking means comprises a locking member, and wherein said head member has surface portions thereon adapted for engagement therewith, said locking member being movable on said body to and from a position of engagement with said surface portions and being effective, in said position of engagement in the operative position of said head member, to restrain rotation of said head member toward said storage position and its rotation in said storage position, from said storage position toward said operative position.

6. The assembly of claim 5 wherein said head member has peripheral edge portions configured to provide said engaging surface portions, said engaging surface portions being disposed to opposite sides of said transverse axis of pivotal movement.

7. The assembly of claim 6 wherein one surface of at least one of said surface portions extends generally along a first axis extending through said transverse axis, and wherein another surface of said one surface portion extends generally perpendicularly to said first axis, said locking member in said engagement position thereof bearing upon said one surface portion in said storage position of said head member, and bearing upon the other surface portion in said operative position thereof, said surface portions being so disposed on said member that each lies above said transverse axis when said locking member bears thereupon.

8. The assembly of claim 7 wherein said locking member is mounted in the upper portion of said body for sliding movement along a longitudinal axis thereof.

9. The assembly of claim 8 wherein said locking member has a shoe portion with first and second surfaces perpendicularly disposed on the lower forward part thereof to bear, respectively, upon said one and other surfaces of said head member, the section of said peripheral edge portion lying between said engaging surface portions of said head member being of arcuate configuration and having said one surface extending inwardly therefrom along said first axis to provide a shoulder element at the juncture therebetween, and wherein said assembly additionally includes means for biasing said locking member forwardly on said body, said biasing means urging said first surface of said shoe portion against said one surface of said head member to maintain said folder position thereof, said locking member being disposed for displacement rearwardly against said biasing means by manual force applied to pivot said head member from said storage position toward said operative position thereof, with such force being transmitted by contact of said shoulder element of said head member upon said first surface of said shoe portion, said shoe portion riding upon said arcuate peripheral section during movement of said head member subsequent to such displacement of said locking member.

10. The assembly of claim 9 wherein said lower forward part of said shoe portion of said locking member has a transitional surface extending between said perpendicularly disposed surfaces, said transitional surface bearing upon said arcuate section during such subsequent movement of said head member.

11. The assembly of claim 7 wherein said surface portions are provided by a pair of generally L-shaped notches formed in the periphery of said head member, each of said notches providing a surface extending along said first axis, and a second surface extending perpendicularly thereto from the inner end of said first surface, said notches being equidistantly spaced from said transverse axis; and wherein said locking member has a shoe portion that seats in said notches in said operative and storage positions of said head member, said shoe portion having first and second surfaces perpendicularly disposed on the lower forward part thereof disposed to bear respectively upon said one and other surface portions of said head member edge portion.

12. The assembly of claim 8 wherein said locking member includes a button portion that lies outwardly of said body to provide said manipulatable portion, said button portion being manipulatable by the finger of user.

13. A folding pocket saw having a removable, foldaway blade: including a blade having a mounting portion and an elongated cutting portion; and a handle assembly comprising (i) a substantially hollow elongated body adapted to be hand held and having an opening extending along its forward end and the underside thereof, (ii) a head member mounted in said hollow body adjacent the forward end thereof and having a blade mounting portion with means thereon disengageably affixing said blade to said head member, said head member being pivotable about a transverse axis of said body between an operative position in which said blade mounting portion and said blade extend axially outwardly through said opening in said forward end of said body, and a storage position in which said blade and blade mounting portion are pivoted downwardly and rearwardly about said pivotal axis to locate said blade substantially within said body along the underside thereof, and (iii) manipulatable locking means movably mounted on said body and having a manipulatable portion extending outwardly thereof, said locking means engaging said head member against rotation about said transverse axis in both of said pivoted positions thereof, said disengageably affixing means being adapted to affix each of a plurality of different blades to said head member for operation by said handle assembly.

14. The folding pocket saw of claim 13 wherein said body has an internal web element extending laterally and longitudinally thereof to provide the lower wall of a spare blade storage chamber therewithin, and to provide the upper wall of an elongated cavity in the lower portion thereof which is coextensive with said opening along part of its length and is adapted for the substantial containment therewithin of said blade affixed to said head member, said body also having an opening formed therein permitting the insertion and withdrawal of spare blades into and from said storage chamber, and having a displaceable closure thereon for covering said opening.

15. The folding pocket saw of claim 14 wherein said locking means comprises a locking member, and wherein said head member has surface portions thereon adapted for engagement therewith, said locking member being movable on said body to and from a position of engagement with said surface portions and being effective, in said position of engagement in the operative position of said head member, to restrain rotation of said head member toward said storage position and in said operative position, from said storage position toward said operative position.

16. The folding pocket saw of claim 15 wherein said locking member is mounted in the upper portion of said body for sliding movement along a longitudinal axis thereof, and where said head member has peripheral edge portions configured to provide said engaging surface portions, said surface portions being disposed to opposite sides of said transverse axis of pivotal movement, one surface of at least one of said surface portions extending generally along a first axis extending through said transverse axis, and another surface of said one surface portion extending generally perpendicularly to said first axis, said locking member in said engagement position thereof bearing upon one surface portion in said storage position of said head member, and bearing upon the other surface portion in said operative position thereof, said surface portions being so disposed on said member that each lies above said transverse axis when said locking member bears thereupon.

17. The folding pocket saw of claim 16 wherein said locking member has a shoe portion with first and second surfaces perpendicularly disposed on the lower forward part thereof to bear, respectively, upon said one and other surface portions of said head member, the section of said peripheral edge portion lying between said engaging surface portions of said head member being of arcuate configuration and having said one surface extending inwardly therefrom along said first axis to provide a shoulder element at the juncture therebetween, and wherein said assembly additionally includes means for biasing said locking member forwardly on said body, said biasing means urging said first surface of said shoe portion against said one surface portion of said head member to maintain said storage position thereof, said locking member being disposed for displacement rearwardly against said biasing means by manual force applied to pivot said head member from said storage position toward said operative position thereof, with such force being transmitted by contact of said shoulder element of said head member upon said first surface of said shoe portion, said shoe portion riding upon said arcuate peripheral section during movement of said head member subsequent to such displacement of said locking member.

18. The folding pocket saw of claim 17 wherein said lower forward part of said shoe portion of said locking member has an arcuate transitional surface extending between said perpendicularly disposed surface, said transitional surface bearing upon said arcuate section during such subsequent movement of said head member.

19. A handle assembly for a tool having interchangeable, fold-away blades, comprising: an elongated body adapted to be hand held; a tool-supporting head member mounted adjacent the forward end of said body for pivotal movement about a transverse axis between an operative position in which a supported blade extends axially outwardly of said body, and a storage position in which the blade is folded inwardly along the underside thereof, comprising (i) a head piece having a recess formed into one side and extending to the peripheral edge thereof, a tongue protruding into said recess adjacent the inner end thereof, and a transverse aperture therethrough; (ii) a clamping piece seated in said recess with a transverse aperture aligned with said aperture of said head piece; and (iii) a removable fastener extending through said apertures and disengageably securing said head piece and clamping piece together, said head piece and clamping piece cooperatively providing said means for affixing blades on said head member and being adapted to secure blades having an end portion configured to seat within said recess in engagement with said protruding tongue and to receive said fastener therethrough, said head member thereby supporting such a blade at two points as well as clamping it between said head piece and said clamping piece thereof; and means on said body for engaging said head member against rotation about said transverse axis in both of said positions thereof, said head member having means thereon for disengageably affixing each of a plurality of different blades thereto for operation by said handle assembly.

20. A tool having a removable, fold-away blade: including a blade and a handle assembly, said handle assembly comprising an elongated body adapted to be hand held, a head member mounted adjacent the forward end of said body, and means disengageably affixing said blade to said head member, said head member being pivotable about a transverse axis of said body, between an operative position in which said blade extends axially outwardly of said body, and a storage position in which said blade is folded inwardly along the underside thereof, said head member comprising (i) a head piece having a recess formed into one side and extending to the peripheral edge thereof, a tongue protruding into said recess adjacent the inner end thereof, and a transverse aperture therethrough, (ii) a clamping piece seated in said recess with a transverse aperture aligned with said aperture of said head piece, and (iii) a removable fastener extending through said apertures and disengageably securing said head piece and clamping piece together, said head piece and clamping piece cooperatively providing said means for affixing said blade on said head member; said blade having an end portion seated within said recess and in engagement with said protruding tongue, said end portion having an aperture aligned with said apertures of said head piece and clamping piece and receiving said fastener therethrough, said head member supporting said blade at two points as well as clamping it between said head piece and said clamping piece thereof, said assembly also including means on said body for engaging said head member against rotation about said transverse axis in both of said positions thereof, said disengageably affixing means being adapted to affix each of a plurality of different blades to said head member for operation by said handle assembly.

* * * * *